United States Patent
Spörle et al.

(10) Patent No.: US 6,699,349 B1
(45) Date of Patent: Mar. 2, 2004

(54) METHOD FOR THE PRODUCTION OF A COVERING ELEMENT FOR POTENTIALLY BREAKABLE MATERIAL

(75) Inventors: Frank Spörle, Leonberg (DE); Michael Walter, Oberkirch/Baden (DE); Anita Warmuth, Singapur (SG)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/914,993

(22) PCT Filed: Feb. 19, 2000

(86) PCT No.: PCT/EP00/01376

§ 371 (c)(1), (2), (4) Date: Jan. 16, 2002

(87) PCT Pub. No.: WO00/53433

PCT Pub. Date: Sep. 14, 2000

(51) Int. Cl.$^7$ .............................. B44C 5/04; B29C 70/68
(52) U.S. Cl. .................. 156/244.12; 156/154; 156/245; 264/279.1; 264/320; 125/1; 428/15; 428/31; 428/332; 428/542.2
(58) Field of Search ................................ 264/138, 279, 264/279.1, 158, 265, 320; 156/61, 153, 154, 244.12, 245; 125/1; 428/15, 31, 332, 542.2

(56) References Cited

U.S. PATENT DOCUMENTS

| 4,923,539 | A | * | 5/1990 | Spengler et al. | ............... | 156/79 |
|---|---|---|---|---|---|---|
| 5,078,815 | A | * | 1/1992 | Othon | ..................... | 156/63 |
| 5,494,548 | A | * | 2/1996 | Baca | ........................ | 156/265 |
| 6,361,732 | B1 | * | 3/2002 | Schumacher | ................ | 264/275 |

FOREIGN PATENT DOCUMENTS

| DE | 1948663 | A | * | 4/1971 | ............ | B29C/5/00 |
|---|---|---|---|---|---|---|
| DE | 39 30 603 | | | 3/1990 | | |
| DE | 296 04 026 | | | 7/1996 | | |
| DE | 297 12 329 | | | 10/1997 | | |
| GB | 2305148 | A | * | 4/1997 | ............ | B32B/1/10 |

* cited by examiner

Primary Examiner—Jeff H. Aftergut
Assistant Examiner—John T. Haran
(74) Attorney, Agent, or Firm—Kenyon & Kenyon

(57) ABSTRACT

A method for the production of a trim part for decorative purposes, especially for the forming of interior and/or exterior trim parts for motor vehicles, having a thin ornamental layer made from an inorganic and/or crystalline material that is fragile in thin-layer form, especially natural stone, includes the following method steps: first, a flexible, at least partially transparent stabilizing material is applied to the surface of a block of inorganic and/or crystalline material and is separated together with a thin ornamental layer from the block of inorganic and/or crystalline material; then the laminate of ornamental layer and stabilizing material is placed in a casting mold for the trim part; the casting mold is closed by moving an upper mold and a lower mold relative to one another, and the ornamental layer is thereby shaped into a desired three-dimensional form determined by the casting mold; then the casting mold is filled with at least approximately transparent material and the ornamental layer is thereby fixed in its predetermined form; and the casting mold is opened and the finished trim part removed.

15 Claims, 1 Drawing Sheet

METHOD FOR THE PRODUCTION OF A COVERING ELEMENT FOR POTENTIALLY BREAKABLE MATERIAL

FIELD OF THE INVENTION

The present invention relates to a method for the production of a trim part for decorative purposes and to a trim part produced by the process.

BACKGROUND INFORMATION

German Published Patent Application No. 296 04 026 describes a utility article having a substantially two-dimensional form and a facing or masking layer made from a brittle natural material, especially stone or a stonelike substance, which is fragile in thin layer form. The facing or masking layer is disposed on a support layer made from a fiber-reinforced material with a plastic matrix. The utility article can however be employed only to a limited extent as a trim part for decorative purposes because its substantially two-dimensional form makes it impossible to use for trim parts with three-dimensional curvature of their surfaces.

German Published Patent Application No. 297 12 329 describes a three-dimensionally curved molding made from a laminated material, in which the decorative elements consist of fibers or a fiber mat. The shape of the three-dimensionally curved part is determined by a molding produced by deep drawing. In this method, however, the use of a brittle material that is fragile in thin-layer form is impossible.

German Published Patent Application No. 39 30 603 describes a trim part and a method for its production, the trim part having a surface shape with a three-dimensional curvature. The final shape is determined by two workpiece molds serving to provide the shape, an upper mold and a lower mold, being laid and hardened in these molds. Thus, only flexible materials can be used as decorative inserts. The use of a brittle material that is fragile in thin-layer form, such as, for example, natural stone, is impossible because of the bending of the material of the decorative insert necessary for shaping purposes.

In a conventional trim part for decorative purposes, especially for interior use, and preferably for the interior trim of passenger compartments of motor vehicles, a decorative layer of a natural material, especially natural stone, is applied on the visible side of a base part. The decorative layer of natural stone can in this method be produced in any desired three-dimensional form. To achieve this, large quantities of the natural substance are used, the desired final surface shape being produced by milling from a solid material. The milled layer is retained on a supporting element, on which it remains in subsequent use. The method allows substantial freedom of design, but suffers from the serious disadvantage of long processing times and a high material input.

It is therefore an object of the present invention to provide a method for the production of a trim part for decorative purposes, especially for the forming of interior and/or exterior trim parts for motor vehicles, having an ornamental layer made from an inorganic and/or crystalline material that is fragile in thin-layer form, wherein the material input for the ornamental layer is minimized and the optical properties of the ornamental layer are at least approximately preserved.

It is a further object of the invention to provide a trim part for decorative purposes with an ornamental layer in which an at least approximately free geometrical and optical design of the trim part is possible.

SUMMARY

The above and other beneficial objects of the present invention are achieved by providing a method as described herein.

The method according to the present invention provides the advantage that a maximum optical effect may be achieved with a low material input of the material for the ornamental layer. The ornamental layer may be brought by the upper and lower molds of the casting mold into the three-dimensional form determined by the particular casting mold. The thin ornamental layer, applied to a flexible stabilizing material, may be shaped as desired in three dimensions by the closing upper and/or lower mold. The ornamental layer is fixed in its predetermined form by the protective layer. As a result there are many possible geometrical designs for the trim part.

The brittle material of the thin ornamental layer according to the present invention, which is fragile in thin-layer form, may fracture along microstructures or crystal edges, but the overall optical impression is not critically changed thereby. The microfine fractures, for example, along crystal boundaries in the case of crystalline materials, are concealed by the protective layer, so that no irregularities are apparent on the surface of the trim part, and, as a result of the fact that the crystals or inorganic microstructures themselves are not destroyed, the optical properties of the inorganic and/or crystalline material of the thin ornamental layer are substantially perfectly preserved.

The flexible stabilizing material may hold the ornamental layer together even when the latter would otherwise collapse because of the fractures described above. A further advantage of the stabilizing material is that it stabilizes the ornamental layer and substantially facilitates handling and transportation of the thin ornamental layer.

As a result of the transparent or partially transparent configuration of the covering layer and the supporting element, it is possible, by backlighting the ornamental layer (by introducing light, for example, by a lighting wire or with two-dimensional lighting devices such as electroluminescent foil) to achieve further optical effects as a result of the light passing through the material used for the ornamental layer, for example, natural stone.

The surface of the casting mold facing what will subsequently be the visible side of the trim part may be designed with very fine surface roughness, so that the transparent or at least partially transparent plastic curing at this surface has a very smooth and uniform surface, making it possible to eliminate further processing of the visible side of the trim part.

DETAILED DESCRIPTION

Figure 1:
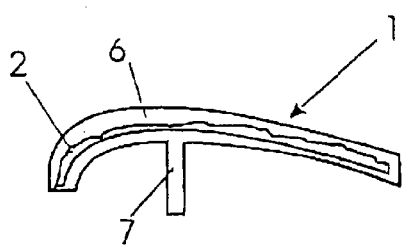
FIG. 1 illustrates a trim part for decorative purposes having an ornamental layer of natural stone.

In connection with an example embodiment, a description will now be given of the method for the production of a trim part 1 for decorative purposes, illustrated in FIG. 1, having a thin ornamental layer 2 of inorganic and/or crystalline material which is fragile in thin-layer form, using the example of an ornamental layer 2 of natural stone.

Figure 2:
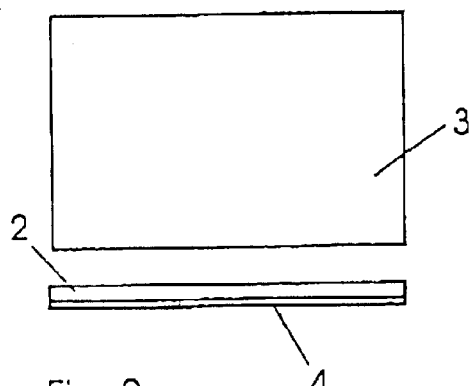
FIG. 2 illustrates a first stage of the method for production of a trim part for decorative purposes according to the present invention.

FIG. 2 illustrates a first stage of the method according to the present invention, in which the thin ornamental layer 2 is separated from a solid block 3 of natural stone. The separation of the ornamental layer 2 occurs by conventional methods of cutting separation, such as, for example, sawing. In order to separate the ornamental layer 2 from the block 3 of natural stone in a thickness of from 0.3 to 0.5 mm, high-precision machinery is required in order to achieve a uniform layer thickness. This method, however, is conventional in principle and is technically feasible. The ornamental layer 2 is retained during separation by a flexible, adhesive stabilizing material 4 and may be fixed to this stabilizing material 4, for example, by a flat retaining device. In addition to the releasable bonding of the ornamental layer 2 to the retaining device, the stabilizing material 4 also serves to prevent the ornamental layer 2 from crumbling and disintegrating during onward transportation and further processing. The thickness of from 0.3 to 0.5 mm may be preferred, as the ornamental layer 2 becomes semi-transparent and is thus suitable for a design option using through lighting, but the natural optical properties are fully preserved, in contrast to even thinner ornamental layers 2.

Figure 3:
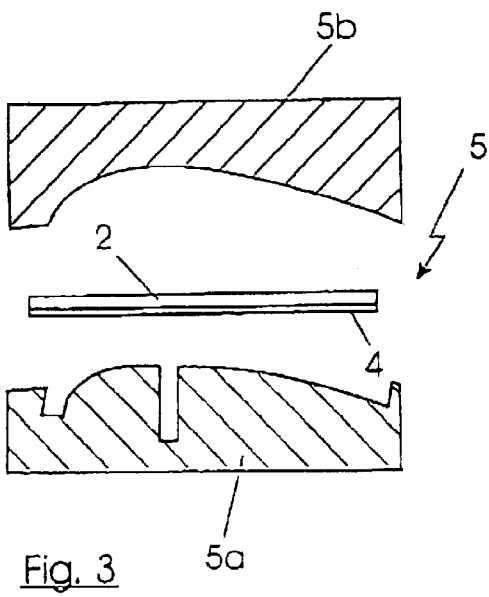
FIG. 3 illustrates a second stage of the method for production of a trim part for decorative purposes according to the present invention.

FIG. 3 illustrates the subsequent stage of the method according to the present invention, in which the laminate of stabilizing material 4 and ornamental layer 2 is laid in a lower mold 5a of a casting mold 5. The stabilizing material 4 is in this case facing the lower mold 5a. As an alternative, however, it is also possible for the ornamental layer 2 to be bonded on its side remote from the stabilizing material 4 to a flexible retaining material and to be laid in the lower mold 5a together with this retaining material, the stabilizing material 4 then being removed. Various adhesives are possible for use as the retaining material or stabilizing material 4, these adhesives dissolving or at least become invisible under the effects of pressure and temperature in the further steps of the method.

As an alternative to this, however, fibers or lattice structures made from organic materials or metals may be employed as stabilizing material or retaining material, these being provided at least on one side with an adhesive layer and being capable of deliberate use for optical effects in the finished trim part 1.

Figure 4:
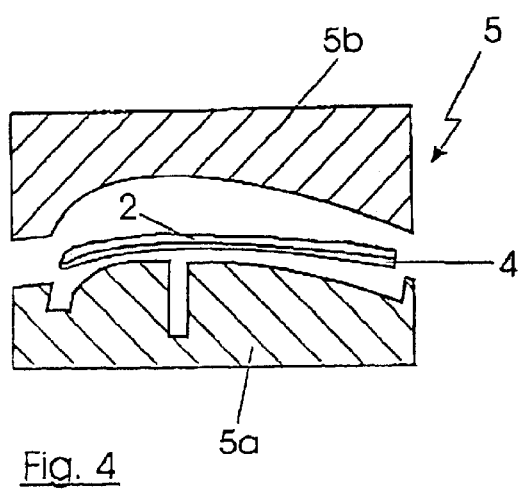
FIG. 4 illustrates a third stage of the method for production of a trim part for decorative purposes according to the present invention.

FIG. 4 illustrates that in the next stage of the method, an upper mold 5b of the casting mold 5 and the lower mold 5a of the casting mold 5 are moved toward one another. The casting mold 5 is thereby closed. The ornamental layer 2, which is still provided with the stabilizing material 4 or the retaining material, is thus brought into a geometrical shape predetermined by the upper mold 5b and the lower mold 5a of the casting mold 5. In the course of this, fractures may occur along existing naturally occurring edges, such as grain or crystal boundaries. The optical properties of the ornamental layer 2 are only slightly impaired by these fractures. The lower mold 5a may still include retaining elements, by which the ornamental layer 2 or the laminate of ornamental layer 2 and stabilizing material 4 is fixed in its desired position.

Figure 5:
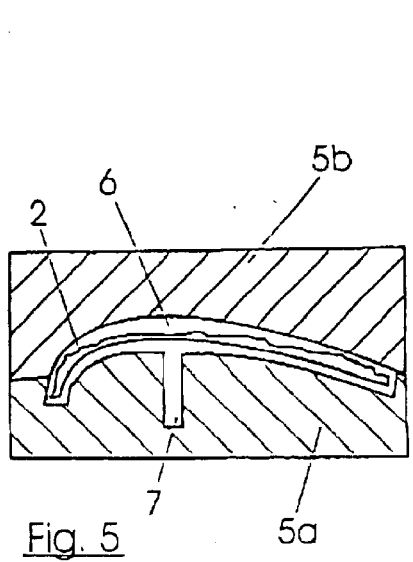
FIG. 5 illustrates a fourth stage of the method for production of a trim part for decorative purposes according to the present invention.

In FIG. 5, the closed casting mold 5 is illustrated. It is filled with transparent material through runners. The transparent or at least partially transparent material may be, for example, a plastics compound which cures to be transparent. The stabilizing material 4 or the retaining material may in this case be enclosed by the liquid transparent material so that the retaining material 4 is not noticeable or mixes with the transparent material under the influence of temperature and pressure to form a homogenous unit. In this case, the ornamental layer 2 is completely surrounded by the cast transparent material, and after cooling a protective layer 6 on what will subsequently be the visible side of the trim part 1 and a supporting element 7 for the subsequent fixing of the trim part 1 are formed.

Figure 6:
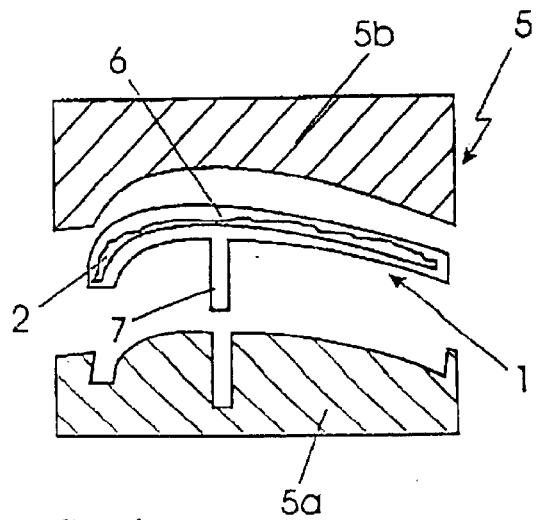
FIG. 6 illustrates a fifth stage of the method for production of a trim part for decorative purposes according to the present invention.

FIG. 6 illustrates that the casting mold 5 is subsequently opened and the trim part 1 of transparent material and the ornamental layer 2 may be removed from the mold for final curing and cooling. The surface of the trim part 1 on the visible side formed by the upper mold 5b may, with an appropriate surface configuration of the upper mold 5b, for example, a polished surface, already be of high quality, so that further processing or finishing of the trim part 1 is unnecessary.

The most suitable use of this trim part 1 is for the configuration of the interior and exterior trims in the field of motor vehicle design. Thus, the decorative elements hitherto frequently produced in so-called "wood veneer" may be replaced with elements having an ornamental layer of natural stone. Numerous further possible uses for the trim parts 1 are possible in the architectural field, in the interior decorating field, in the production of jewelry and in artistic use.

What is claimed is:

1. A method for producing a trim part for decorative purposes having a thin ornamental layer made from at least one of an inorganic material and a crystalline material that is fragile in thin-layer form, comprising the steps of:

applying a flexible and at least partially transparent stabilizing material to a surface of a block of at least one of inorganic material and crystalline material;

separating the stabilizing material with a thin ornamental layer from the block;

placing a laminate of the ornamental layer and the stabilizing material in a casting mold for the trim part;

closing the casting mold by moving an upper mold and a lower mold relative to one another to shape the ornamental layer into a desired three-dimensional form in accordance with the casting mold;

filling the casting mold with at least approximately transparent material to fix the ornamental layer into the desired three-dimensional form; and opening the casting mold and removing a finished trim part.

2. The method according to claim 1, wherein the trim part includes at least one of an interior trim part and an exterior trim part for a motor vehicle.

3. The method according to claim 1, wherein the ornamental layer is made from natural stone.

4. The method according to claim 1, further comprising the step of separating the laminate of the ornamental layer and the stabilizing material from the block by mechanical separation.

5. The method according to claim 4, wherein the mechanical separation includes cutting.

6. The method according to claim 4, further comprising the step of detachably connecting the ornamental layer by the stabilizing material to a retaining device during the separating step.

7. The method according to claim 1, wherein the laminate of ornamental layer and stabilizing material is introduced in the placing step so that the stabilizing material comes to rest on a side remote from a visible side and is laid on retaining elements in the lower mold of the casting mold.

8. The method according to claim 7, further comprising the step of providing surfaces of the upper mold of the casting mold disposed opposite to visible surfaces of the trim part with polished surfaces.

9. A trim part for decorative purposes, having a thin ornamental layer made from at least one of an inorganic material and a crystalline material that is fragile in thin-layer form, the trim part being formed in accordance with a method including the steps of:

applying a flexible and at least partially transparent stabilizing material to a surface of a block of at least one of inorganic material and crystalline material;

separating the stabilizing material with a thin ornamental layer from the block;

placing a laminate of the ornamental layer and the stabilizing material in a casting mold for the trim part;

closing the casting mold by moving an upper mold and a lower mold relative to one another to shape the ornamental layer into a desired three-dimensional form in accordance with the casting mold;

filling the casting mold with at least approximately transparent material to fix the ornamental layer into the desired three-dimensional form; and opening the casting mold and removing a finished trim part;

wherein one surface of the ornamental layer is provided with the stabilizing material, the ornamental layer being configured to be shapable in three dimensions into a form other than a flat form, the ornamental layer being at least partially fixable in its form by a protective layer of the at least approximately transparent material.

10. The trim part according to claim 9, wherein the ornamental layer has a thickness of 0.1 mm to 1.0 mm.

11. The trim part according to claim 9, wherein the ornamental layer has a thickness of 0.3 mm to 0.5 mm.

12. The trim part according to claim 9, wherein the ornamental layer is disposed on a support element formed of at least partially transparent material.

13. The trim part according to claim 12, wherein the support element and the protective layer are formed of a one-piece design, the ornamental layer being at least approximately completely enclosed by the support element and the protective layer.

14. The trim part according to claim 9, wherein a visible surface of the protective layer is disposed at least approximately parallel to a visible surface of the ornamental layer.

15. The trim part according to claim 9, wherein the stabilizing material includes a lattice structure.

* * * * *

UNITED STATES PATENT AND TRADEMARK OFFICE
CERTIFICATE OF CORRECTION

PATENT NO. : 6,699,349 B1
DATED : March 2, 2004
INVENTOR(S) : Spörle et al.

It is certified that error appears in the above-identified patent and that said Letters Patent is hereby corrected as shown below:

Title page,
Item [54], Title, should read as follows:

-- METHOD FOR THE PRODUCTION OF A TRIM PART FOR DECORATIVE PURPOSES --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,699,349 B1
DATED         : March 2, 2004
INVENTOR(S)   : Spörle et al.

It is certified that error appears in the above-identified patent and that said Letters Patent is hereby corrected as shown below:

<u>Title page,</u>
Insert Item:
-- [73]   Assignee:   DaimlerChrysler AG, Stuttgart (DE)
                     Rochus Jogerst GmbH, Oberkirch (DE) --.

Signed and Sealed this

Twenty-fourth Day of January, 2006

JON W. DUDAS
*Director of the United States Patent and Trademark Office*